(12) United States Patent
Grimm et al.

(10) Patent No.: US 8,698,508 B2
(45) Date of Patent: Apr. 15, 2014

(54) METHOD AND APPARATUS FOR DETECTING RADOME DAMAGE

(75) Inventors: Jerry M. Grimm, Plano, TX (US); James A. Pruett, Allen, TX (US)

(73) Assignee: Raytheon Company, Waltham, MA (US)

( * ) Notice: Subject to any disclaimer, the term of this patent is extended or adjusted under 35 U.S.C. 154(b) by 430 days.

(21) Appl. No.: 13/215,723

(22) Filed: Aug. 23, 2011

(65) Prior Publication Data

US 2013/0049769 A1  Feb. 28, 2013

(51) Int. Cl.
*G01R 27/28* (2006.01)

(52) U.S. Cl.
USPC ............... 324/649; 324/605; 342/165

(58) Field of Classification Search
USPC ............... 324/649, 602, 695; 342/165
See application file for complete search history.

(56) References Cited

U.S. PATENT DOCUMENTS

| | | | |
|---|---|---|---|
| 3,936,736 A | 2/1976 | Ray | |
| 5,309,533 A | 5/1994 | Bonniau et al. | |
| 6,674,292 B2 | 1/2004 | Bray et al. | |
| 6,686,872 B2 | 2/2004 | Vacanti | |
| 2004/0036645 A1* | 2/2004 | Fujieda et al. | 342/70 |
| 2005/0284232 A1 | 12/2005 | Rice | |
| 2009/0188904 A1 | 7/2009 | Schwerer et al. | |
| 2010/0066386 A1 | 3/2010 | Dos Santos et al. | |

FOREIGN PATENT DOCUMENTS

| | | |
|---|---|---|
| DE | 2551366 B2 | 6/1978 |
| DE | 3622656 C1 | 10/1987 |
| JP | 57065006 A | 4/1982 |

OTHER PUBLICATIONS

Bocherens, E. et al., "Damage Detection in a Radome Sandwich Material with Embedded Fiber Optic Sensors", Smart Materials and Structures, vol. 9, 2000, pp. 310-315.

* cited by examiner

*Primary Examiner* — Vincent Q Nguyen

(74) *Attorney, Agent, or Firm* — Lando & Anastasi, LLP

(57) ABSTRACT

A method and system for detecting and localizing damage on a radome. In one example, the system includes a detection mesh made up of an arrangement of conductive wires integral with the radome structure, and a digital strobe circuit coupled to the detection mesh that measures the detection mesh and reports results. In one example, the system includes a controller coupled to the strobe circuit and configured to assess the results and localize the damage based on measured changes in impedance of individual wires within the detection mesh. The controller may be further configured to provide a damage report to a user interface, the damage report optionally identifying the damaged area(s) of the radome.

22 Claims, 4 Drawing Sheets

METHOD AND APPARATUS FOR DETECTING RADOME DAMAGE

BACKGROUND

Radomes are used to protect antennas and associated equipment from environmental damage. Particularly, a purpose of structurally thick radomes is to protect expensive or mission-critical radar equipment from environmental damage (for example, wind-blown debris, hail, tree strikes, bird strikes, or even from ballistic fire or shrapnel), thus allowing the radar to continue to operate. The radar systems are reliant on the radio frequency (RF) transmissiveness of the radome. However, stopping environmental threats may damage the radome and introduce localized RF losses. As a result, depending on the nature and/or extent of the radome damage, the radar may have degraded performance over a portion of its field of regard.

Existing methods of detecting damage to radomes include the use of radar interrogation of the radome to find damage, thus requiring the use of additional RF equipment. Some examples use external RF equipment to analyze the radome. Other examples for in-situ testing use additional out-of-band radars to detect damage to the radome. These methods require image-based processing and similar RF analysis algorithms as are used to process the in-band radar signals.

A presently preferred method of detecting radome damage is to use embedded optical fibers coupled with optical interferometric processing to attempt to detect structural deformations of thin composite radomes. This approach is costly and does not address detection of point damage on structurally thick radomes, which do not deflect or deform in a manner similar to thin composite radomes.

SUMMARY OF INVENTION

Aspects and embodiments are directed to a method and apparatus for detecting and localizing radome damage. Certain embodiments use a conductive detection mesh disposed on an exterior surface of or embedded in the radome, coupled with a strobe circuit to measure the detection mesh and report results, and a controller configured to assess the results, as discussed further below.

According to one embodiment, a radome damage detection apparatus comprises a conductive detection mesh embedded within a radome, the conductive detection mesh including a plurality of conductive wires, a digital strobe circuit coupled to the conductive detection mesh and configured to apply electrical signals to the plurality of conductive wires, to detect an impedance response of the plurality of conductive wires, and to provide a detection report based on the impedance response, and a controller coupled to the digital strobe circuit and configured to receive the detection report from the digital strobe circuit and to provide a damage report indicating damage to the radome responsive to the detection report indicating a change in impedance of at least one conductive wire of the plurality of conductive wires.

In one example, the conductive detection mesh is a two-dimensional conductive detection mesh and the plurality of conductive wires includes a first plurality of conductive wires oriented in a first dimension and a second plurality of conductive wires oriented in a second dimension, the first and second pluralities of conductive wires intersecting one another to provide the two-dimensional conductive detection mesh. In one example, the first and second dimensions are orthogonal and the two-dimensional conductive detection mesh is a rectangular grid. The detection report may include information identifying results of individual strobes of each of the first and second pluralities of conductive wires, and the controller may be configured to localize the damage to the radome based on a pre-programmed layout of the detection mesh on the radome and to provide in the damage report information identifying a damaged region of the radome. In another example, the detection report indicates a change in impedance of at least one conductive wire in the first plurality of conductive wires and at least one conductive wire in the second plurality of conductive wires, and the controller is configured to localize the damage to the radome based on identification of an area where the at least one conductive wire in the first plurality of conductive wires and the at least one conductive wire in the second plurality of conductive wires intersect. The controller may be coupled to a radar system protected by the radome and may be configured to control the radar system to adapt a coverage pattern of the radar system responsive to the damage report. In one example, the controller is configured to control the radar array to adapt the coverage pattern of the radar system to substantially avoid the damaged region of the radome.

The radome damage detection apparatus may further comprise a user interface coupled to the controller, wherein the controller is configured to display the damage report on the user interface. The radome damage detection apparatus may further comprise a wireless transmitter coupled to the controller, the controller being configured to control the wireless transmitter to transmit the damage report to a remote location. In one example, the plurality of conductive wires provides a radome heating system. In another example, the conductive detection mesh is a first detection mesh embedded within the radome at a first depth, and the radome damage detection apparatus further comprises at least one additional conductive detection mesh embedded within the radome at a depth different from the first depth.

According to another embodiment, a method of detecting damage to a radome comprises digitally strobing a conductive mesh embedded in the radome, the conductive mesh including an arrangement of conductive circuits, and providing a damage report indicating damage to the radome responsive to detecting a change in impedance of at least one of the conductive circuits.

In one example of the method, the arrangement of conductive circuits includes a first plurality of conductive wires oriented in a first dimension and a second plurality of conductive wires oriented in a second dimension, the first and second pluralities of conductive wires intersecting one another to provide a two-dimensional conductive mesh, and the method further comprises localizing the damage to the radome responsive to detecting the change in impedance in a first conductive wire in the first plurality of conductive wires and a second conductive wire in the second plurality of conductive wires and determining an intersection of the first and second conductive wires. In one example, localizing the damage to the radome includes correlating the intersection of the first and second conductive wires with a damaged area of the radome based on a pre-programmed layout of the conductive mesh on the radome. Providing the damage report may include identifying the damaged area of the radome. In one example, the radome is disposed over a radar system and the method further comprises altering a coverage pattern of the radar system responsive to the damage report. Altering the coverage pattern may include altering the coverage pattern to substantially avoid the damaged area of the radome. In another example, the method further comprises wirelessly transmitting the damage report to a user interface, and displaying the damage report on the user interface.

According to another embodiment, a radome comprises an integral damage detection mesh including an arrangement of conductive wires embedded in the radome, and a digital strobe circuit coupled to the damage detection mesh and configured to apply electrical signals to the conductive wires, to measure an impedance response of the conductive wires, and to provide a damage detection report based on the impedance response. In one example, the arrangement of conductive wires includes a first plurality of conductive wires oriented in a first dimension and a second plurality of conductive wires oriented in a second orthogonal dimension, the first and second pluralities of conductive wires intersecting one another to provide the damage detection mesh as a two-dimensional rectangular grid. In another example, the arrangement of conductive wires includes an arrangement of nichrome wires. The arrangement of conductive wires may include a first layer of conductive wires embedded at a first depth within the radome and a second layer of conductive wires embedded at a second depth within the radome.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Aspects and embodiments are directed to a system and method for remotely and automatically detecting radome damage. Damage to a radome protecting a radar system, depending upon location, can significantly affect the performance of the radar system. Moreover, the damage to the radome and/or effects of the damage on the radar performance may not be immediately apparent to users of the radar system. For example, in many applications, the radar system and radome are mounted external to a vehicle, ship or aircraft, and are inaccessible to users inside. Safety concerns and/or environmental conditions may prevent the users from exiting the vehicle to inspect the radome. Therefore, a system and method for detecting radome damage and alerting users to the damage may provide a significant benefit in allowing users to be made aware that the performance of the radar system is potentially degraded. Furthermore, in many instances radome damage is localized and may affect only a portion of the field of regard of the radar system. Accordingly, aspects and embodiments are also directed to methods of determining where and to what extent the radome is damaged. Given this information, a user can know the area of the field of regard of the radar which may suffer degraded performance due to the radome damage, and in some cases, the radar coverage pattern may be altered to account for the damaged area of the radome, as discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
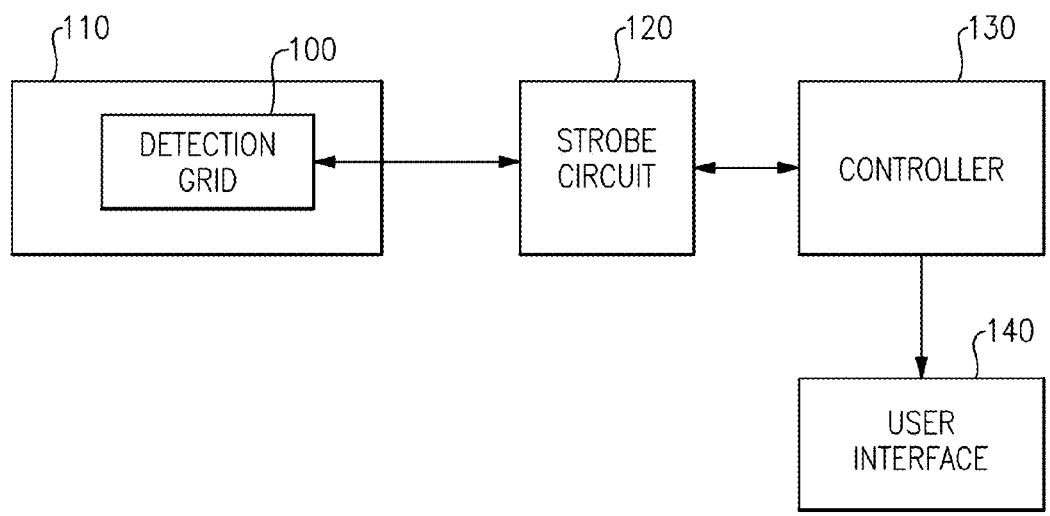
FIG. 1 is a block diagram of one example of a radome damage detection system according to aspects of the invention.

Referring to FIG. 1 there is illustrated a block diagram of one example of a radome damage detection system according to one embodiment. The system includes a detection mesh 100 integral with the radome 110, and a strobe circuit 120 coupled to the detection mesh 100 and configured to analyze the detection mesh and report results, as discussed further below. The system may also include a controller 130 coupled to the strobe circuit 120 and configured to assess the results provided by the strobe circuit to localize damage to the radome 110, as discussed further below. A user interface 140 may provide an indication of the existence, and optionally extent, of the damage to a user using audio and/or visual cues.

According to one embodiment, the detection mesh 100 comprises an arrangement of conductive wires embedded in the radome structure. In one example, the detection mesh 100 augments an outer layer of the radome 110. The detection mesh 100 may be arranged on the outer (external) surface of the radome, or may be incorporated within an outer skin such that a relatively thin layer of material may cover the detection mesh. The geometry of the detection mesh 100 may be configured to allow effective RF transmission of the energy from the protected radar array and digital (baseband) strobing of the mesh to localize damage across an area or volume, as discussed further below.

Figure 2A:
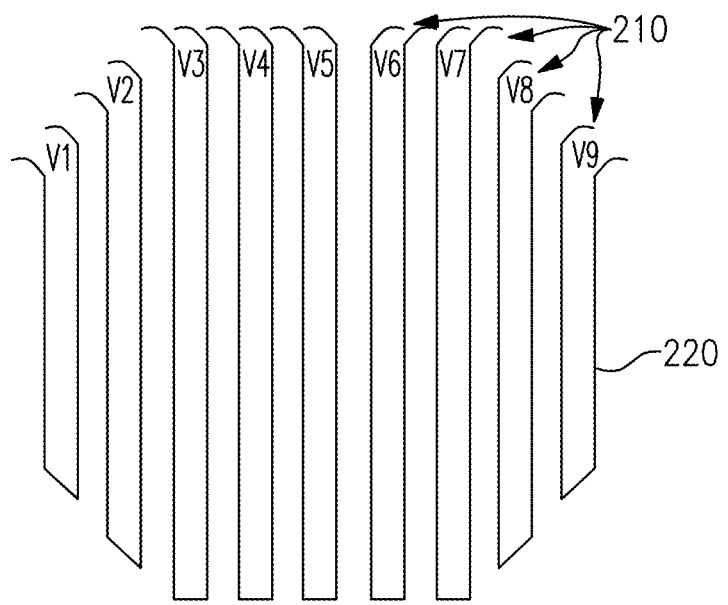
FIG. 2A is a diagram of one example of a vertical detection grid according to aspects of the invention.
Figure 2B:
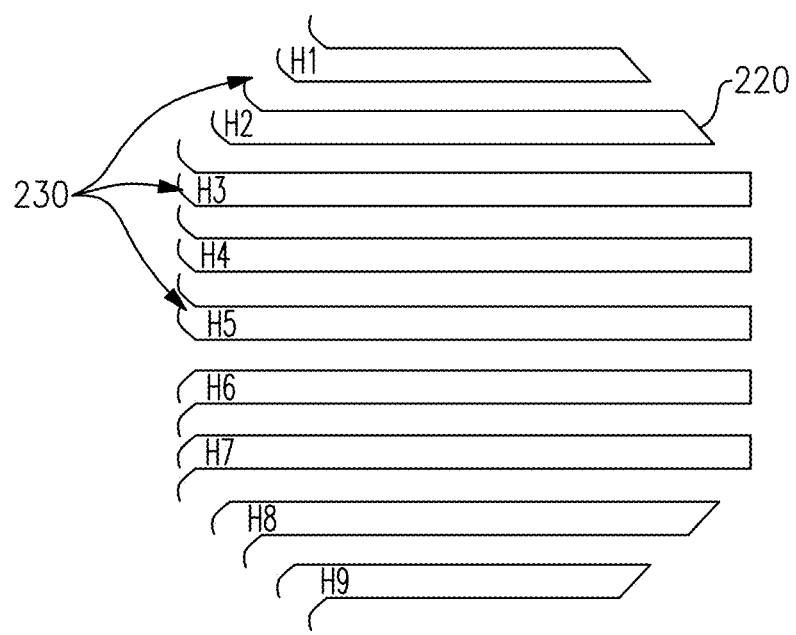
FIG. 2B is a diagram of another example of a horizontal detection grid according to aspects of the invention.
Figure 2C:
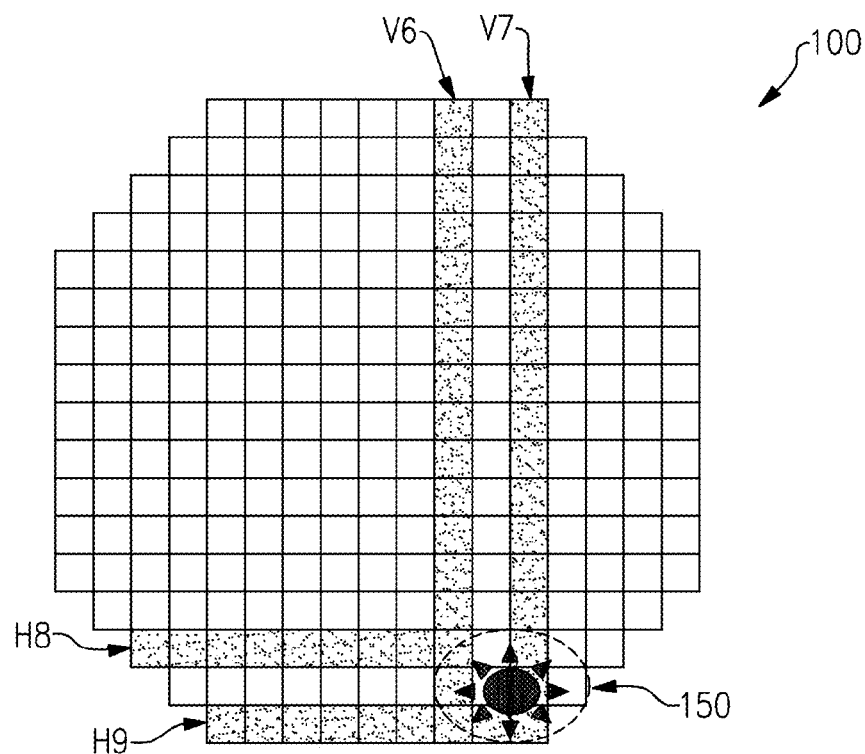
FIG. 2C is a diagram of one example of a detection mesh formed from an overlay of the grids of FIGS. 2A and 2B according to aspects of the invention.

In one example, the detection mesh 100 includes an array of overlapped orthogonally oriented circuits that form a rectangular grid, as illustrated in FIGS. 2A-2C. Referring to FIG. 2A, a vertical array of circuits 210, each circuit formed of one or more conductive wires 220, is arranged on a first grid sheet of an outer matching layer of the radome. In the illustrated example, there are nine vertical circuits 210 (V1 ... V9), each of which is connected to the digital strobe circuit 120. Similarly, as illustrated in FIG. 2B, the detection mesh 100 may include a horizontal array of circuits 230 (H1 ... H9 in the illustrated example), each of which is also connected to the digital strobe circuit 120. The horizontal array may be arranged on a second grid sheet of the outer matching layer of the radome. The first and second grid sheets may be sub-layers of the outer matching layer of the radome 110, and are electrically insulated from one another. The vertical and horizontal arrays may be overlaid to form a rectangular grid, as illustrated in FIG. 2C.

In the examples illustrated in FIGS. 2A-2C, the detection mesh 100 is a rectangular grid including an equal number of horizontal and vertical circuits 210, 230. However, there are numerous different configurations of the detection mesh 100 that may be implemented according to various embodiments. For example, the detection mesh 100 need not have a rectangular geometry, but may instead have a triangular, quadrilateral, trapezoidal, or other geometry that allows for digital strobing to localize damage across an area. In addition, the detection mesh 100 need not have the same number of circuits in each dimension. For example, depending on the shape of the radome to be covered with the mesh, the detection mesh 100 may have more or fewer circuits in one dimension (e.g., horizontal circuits 230) than in the other dimension (e.g., vertical circuits 210). The shape and arrangement of the overall detection mesh 100, as well as of the individual circuits within the mesh, and the number of circuits used in the mesh may vary depending on the shape of the radome or other factors, such as RF transmission constraints and desired damage localization accuracy, as discussed further below.

According to one embodiment, the digital strobe circuit 120 is configured to apply an electrical signal to the conductive wires 220, periodically strobing each circuit 210, 230. Processing the results of the mesh strobe signals may reveal no changes to the line impedance of a given circuit 210, 230, indicating no damage to that circuit, or a significant change in the line impedance of the circuit, such as an open circuit condition, indicating damage to that circuit. This approach leverages the fact that any damage to the radome that can substantially affect the RF performance of the radar likely will also tear or break the detection mesh circuits in the radome structure, resulting in a measurable change in impedance. In one example, the digital strobe circuit 120 may report an overall "damage" or "no damage" result to the controller 130 or directly to the user interface 140. In another example, the digital strobe circuit 120 may report the results of individual strobes such that the controller 130 may localize the damage based on information about which of the detection mesh circuits are damaged.

The controller 130 may be programmed with information about the layout of the detection mesh 100 on the radome 110. Accordingly, the controller may correlate damaged circuits 220 in the detection mesh 100 with damaged areas of the radome 110. Identification of where multiple mesh circuits reporting damage intersect localizes the damage. For example, referring to FIG. 2C, if damage is reported on vertical grid circuits V6 and V7, and on horizontal grid circuits H8 and H9, the controller 130 may determine a corresponding damaged area 150 of the radome 110. Multiple damaged circuits close together may allow an approximate measurement of the damaged area of the radome. Multiple damaged circuits dispersed over different portions of the detection mesh 100 may indicate multiple damage locations on the radome 110.

According to another embodiment, multiple detection meshes 100, or grid sheets of the detection mesh 100, may be disposed at different depths within the outer matching layer, or other layers, of the radome 110. Vertical layering of the detection mesh 100 may allow a determination of the degree (or depth penetration) of the damage to the radome 110. For example, if only a topmost detection mesh reports damage, a user may know that the damage may be relatively minor in terms of impacting the structure of the radome (even if the area extent of the damage may be relatively large); whereas if a deep layer of the detection mesh reports damage, this may indicate severe damage, at least to the impacted portion of the radome. Thus, the detection mesh 100 may be implemented using a plurality of different layers (or grid sheets) and arrangements of conductive wires 220 to provide any of numerous options for localizing damage to the radome 110. For example, a detection mesh 100 that includes a single grid sheet of conductive wires (e.g., a vertical array or horizontal array of conductive circuits) may provide one-dimensional (e.g., "row" or "column") localization of damage to the radome 110. In other examples, the detection mesh 100 may be configured to allow for localization of damage over the surface area of the radome, and optionally a measurement or estimate of the depth of the damage, as discussed above.

Figure 3:
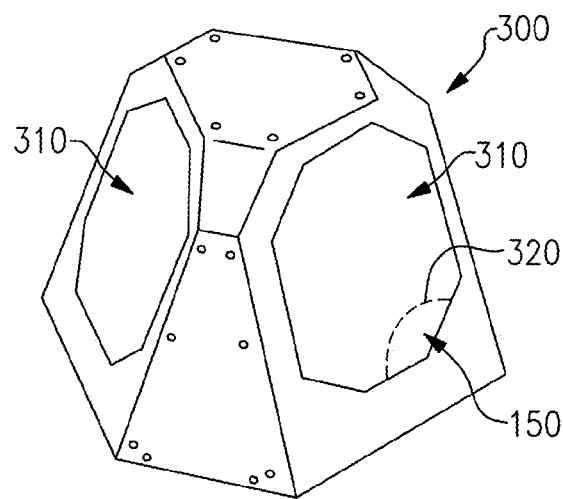
FIG. 3 is a diagram of one example of a radome in which embodiments of a damage detection system according to aspects of the invention may be implemented.

Referring to FIG. 3 there is illustrated one example of a structurally thick radome 300 in which embodiments of the detection mesh 100 may be implemented. In this example, the radome 300 includes several different transmission areas 310. These transmission areas correspond to the portions of the radome 300 through which the underlying radar is configured to transmit and receive RF energy. Accordingly, damage to any of the transmission areas 310 may affect the performance of the radar. In one example, the radome 300 is configured to include a detection mesh 100 across each transmission area 310. Each of these detection meshes 100 may be coupled to the controller 130 and addressed in a manner that allows the controller to identify each detection mesh and correlate it with a particular transmission area 310. Thus, based on the reports it receives from the detection meshes 100, the controller 130 may localize damage in any of the transmission areas 310. In one example, the controller 130 may then identify to the user interface 140 which transmission area(s) 310 is damaged and where, such that a user can know which portion(s) of the field of regard of the radar may suffer degraded performance.

According to a variety of examples, the controller 310 includes a commercially available processor such as processors manufactured by Texas Instruments, Intel, AMD, Sun, IBM, Motorola, Freescale and ARM Holdings. However, the controller 310 may be any type of processor, field-programmable gate array, multiprocessor or controller, whether commercially available or specially manufactured, programmed to perform the processing and functions discussed herein. In some embodiments, the controller 130 may part of radar system that is protected by the radome, and may be coupled to the radar antenna array.

Various types of radars may include adaptive antenna arrays or electronically steered arrays, and the transmit/receive pattern of the antenna array may be dynamically alterable. Accordingly, in one embodiment, the radar may be controlled responsive to the damage information processed by the controller 130 to alter the antenna pattern to avoid the damaged area(s) of the radome 110. For example, referring to FIG. 3, based on the reports from the strobe circuit 120, the controller 130 may determine that the radome 110 has a damaged area 150, and define a "keep out" zone 320. With knowledge of the radar antenna transmit/receive pattern relative to the radome, the antenna pattern may be altered to avoid the keep out zone 320. Alternation of the antenna pattern may be performed automatically by the radar system in response to information from the controller 130, or may be manually implemented by a user of the radar system. In addition, or if the antenna pattern cannot be sufficiently altered, the controller 130 may provide information identifying the keep out zone 320 to the user interface, to alert users to the portions of the radar field of regard that may be affected by the radome damage.

According to another embodiment, the controller 130 may further include, or be coupled to, a wireless transmitter and configured to transmit a damage report to a remote user interface or other system component. For example, the damage report may include information that the radome has been damaged, and optionally information identifying the location and extent (i.e., estimated size of the damaged area) of the damage on the radome. This may allow remote diagnosis and evaluation of radome damage.

As discussed above, various characteristics of the detection mesh 100 may be selected with consideration given to the impact of the mesh on the RF performance of the protected radar system, among other factors. Generally, it would be considered undesirable to place conductive material (such as the conductive circuits 220) in front of a radar system. However, simulated data discussed below and presented in FIGS. 4A-4C demonstrate that with an appropriate mesh spacing and wire thickness, the impact of the detection mesh 100 on the radar performance may be minimal. Both the vertical and horizontal circuits 210, 230 of the detection mesh 100 may affect the co-polarization and cross-polarization response of the radar antenna. Accordingly, in one embodiment the detection mesh may be designed to minimize attenuation of both polarizations.

Figure 4A:
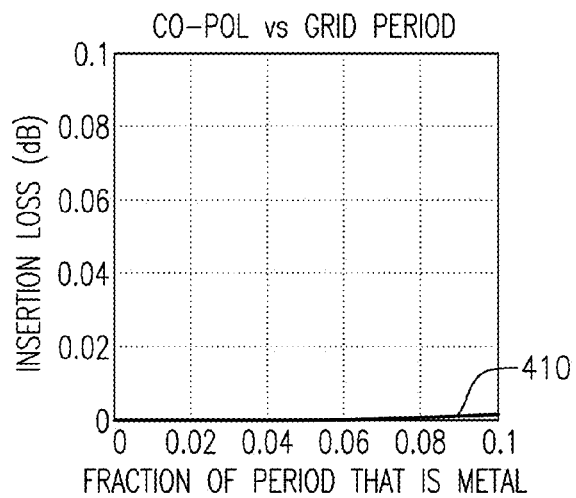
FIG. 4A is a graph of the simulated insertion loss (in dB) of the co-polarization response of a radar antenna as a function of the fraction of the detection grid period that is metal for an example damage detection grid according to aspects of the invention.
Figure 4B:
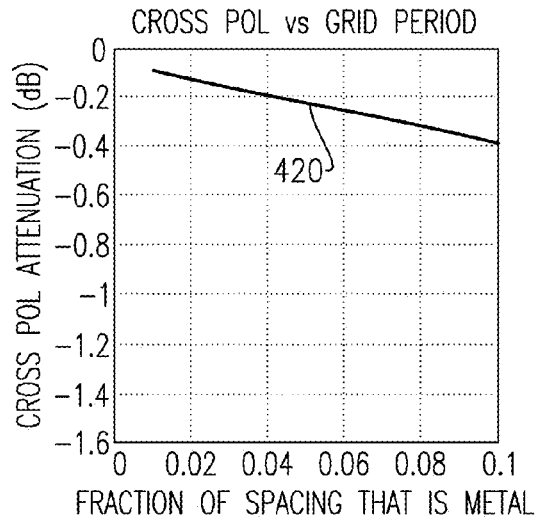
FIG. 4B is a graph of the simulated cross-polarization attenuation of the radar antenna as a function of the fraction of the detection grid period that is metal for the same example damage detection grid according to aspects of the invention.
Figure 4C:
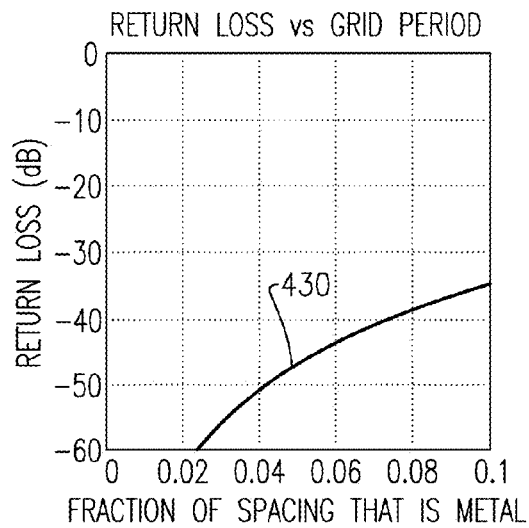
FIG. 4C is a graph of the simulated return loss of the radar antenna versus grid period for the same example detection grid according to aspects of the invention.

The performance of an example of the detection mesh 100 of FIG. 2C was simulated for the following conditions. The detection mesh was a rectangular grid having a grid period was 0.25 inches and the thickness of each conductive wire 220 was 5 mils. The center operating frequency of the radar antenna array was assumed to be 34 GHz. A grid period of 0.25 inches may allow the system to detect radome damage that is at least 0.25 inches in size. This grid period may allow for damage localization to within ±0.375 inches. FIG. 4A illustrates a graph of the insertion loss (in dB) of the co-polarization response (trace 410) as a function of the fraction of the detection grid period that is metal (i.e., the ratio of the thickness of the conductive wires 220 to the spacing between wires in a given dimension). For the simulation, grid spacing was varied to change the fraction of the detection grid period that is metal; however, the fraction may also be changed by changing the wire thickness. As can be seen with reference to FIG. 4A, the insertion loss due to the presence of the detection grid is negligible, less than 0.01 dB, for the above-described example grid. FIG. 4A graphs the insertion loss due to the detection grid alone; the radome itself adds insertion loss above that illustrated in FIG. 4A. FIG. 4B illustrates the cross-polarization attenuation (trace 420) as a function of the fraction of the detection grid period that is metal. For the above-described example grid, the cross-polarization varied from about 0.13 dB to about 0.4 dB with an increasing fraction of the grid period being made up of the conductive wires 220. The total two-way attenuation resulting from both the vertical and horizontal grid arrays combined for this example grid (with a 2% metal fraction and grid spacing of 0.25 inches) is about 0.53 dB at 34 GHz. FIG. 4C illustrates the simulated return loss (trace 430) versus grid period for the same example detection grid. The return loss illustrated in FIG. 4C does not include the contribution/impact of the radome itself.

According to one embodiment the damage detection mesh 100 may be combined with a de-icing system on the radome 110. For example, the detection mesh 100 may be formed using nichrome wire and coupled to a heating controller and power source that heats the mesh wires to de-ice the radome or prevent ice from forming on the radome. Nichrome is a nickel-chromium alloy having high electrical resistance and an ability to withstand high temperatures, which is used for resistance heating elements. In one example, the controller 130 may be configured as the heating controller in addition to performing damage detection functions as discussed above. In another example, the damage detection functions may be added to an existing heating mesh included in a radome. For example, a strobe circuit 120 may be coupled to the heating mesh, and a controller 130 coupled to the strobe circuit, as discussed above. The controller 130 may include an existing controller, for example of the heating system and/or protected radar system, which is configured to perform damage detection processing as discussed above.

According to another embodiment, the damage detection mesh 100 may be implemented as part of a frequency selective surface for the radome 110. For example, the detection mesh 100 is a conductive mesh over the radome, and therefore over the underlying radar system, such that the radome appears as a metallic wall at certain frequencies, thus providing shielding of the radar from environmental interference from said frequencies.

Thus, aspects and embodiments provide a method and system for detecting and localizing damage on a radome. Embodiments of the system include a detection mesh that is made up of an arrangement of conductive wires that are integral with the radome structure, and a digital strobe circuit coupled to the detection mesh that measures the detection mesh and reports results. A controller coupled to the strobe circuit may assess the results and localize the damage. Embodiments of the system may detect damage over the entire radome, and may detect single or multiple points of damage. The controller may localize the damage to within an accuracy allowed by RF design constraints on the detection mesh, as discussed above. In some examples, the controller may be configured to provide an estimated measurement of the damaged area, provided the damaged area extends over several circuits of the detection mesh. The systems and methods discussed herein allow the controller, radar system operating software, and/or a user, to diagnose that radome damage has occurred, assess probable reduction in radar performance in the zone(s) of the radar field of regard corresponding to the area(s) of the radome affected by the damage, and optionally adapt the transmit/receiver patterns of the radar antenna array to compensate for effects of the damage to the radome.

Embodiments of the systems and methods discussed herein may provide benefits and advantages in many applications. For example, as discussed above, damage to radomes, such as ballistic radomes which may protect mission-critical equipment, may be detected where conventional damage detection methods may not be applicable to structurally thick radomes. In addition, the systems and methods may be used to detect and respond to damage to other types of radomes, for example, resulting from bird strikes or other objects impacting the radome. Although the above discussion and examples have referred to detecting radome damage, a similar detection mesh and strobe circuit combination may be used to detect and assess damage to other structures, such as armored glass, for example. Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A radome comprising:
an integral damage detection mesh including an arrangement of conductive wires embedded in the radome; and
a digital strobe circuit coupled to the damage detection mesh and configured to apply electrical signals to the conductive wires, to measure an impedance response of the conductive wires, and to provide a damage detection report based on the impedance response.

2. The radome of claim 1, wherein the arrangement of conductive wires includes a first plurality of conductive wires oriented in a first dimension and a second plurality of conductive wires oriented in a second orthogonal dimension, the first and second pluralities of conductive wires intersecting one another to provide the damage detection mesh as a two-dimensional rectangular grid.

3. The radome of claim 1, wherein the arrangement of conductive wires includes an arrangement of nichrome wires.

4. The radome of claim 1, wherein the arrangement of conductive wires includes a first layer of conductive wires embedded at a first depth within the radome and a second layer of conductive wires embedded at a second depth within the radome.

5. A method of detecting damage to a radome, the method comprising:
digitally strobing a conductive mesh embedded in the radome, the conductive mesh including an arrangement of conductive circuits; and
providing a damage report indicating damage to the radome responsive to detecting a change in impedance of at least one of the conductive circuits.

6. The method of claim 5, wherein the arrangement of conductive circuits includes a first plurality of conductive wires oriented in a first dimension and a second plurality of conductive wires oriented in a second dimension, the first and second pluralities of conductive wires intersecting one another to provide a two-dimensional conductive mesh, the method further comprising:
localizing the damage to the radome responsive to detecting the change in impedance in a first conductive wire in the first plurality of conductive wires and a second conductive wire in the second plurality of conductive wires and determining an intersection of the first and second conductive wires.

7. The method of claim 6, wherein localizing the damage to the radome includes correlating the intersection of the first and second conductive wires with a damaged area of the radome based on a pre-programmed layout of the conductive mesh on the radome.

8. The method of claim 7, wherein providing the damage report includes identifying the damaged area of the radome.

9. The method of claim 8, wherein the radome is disposed over a radar system, the method further comprising altering a coverage pattern of the radar system responsive to the damage report.

10. The method of claim 9, wherein altering the coverage pattern includes altering the coverage pattern to substantially avoid the damaged area of the radome.

11. The method of claim 5, further comprising:
wirelessly transmitting the damage report to a user interface; and
displaying the damage report on the user interface.

12. A radome damage detection apparatus comprising:
a conductive detection mesh embedded within a radome, the conductive detection mesh including a plurality of conductive wires;
a digital strobe circuit coupled to the conductive detection mesh and configured to apply electrical signals to the plurality of conductive wires, to detect an impedance response of the plurality of conductive wires, and to provide a detection report based on the impedance response; and
a controller coupled to the digital strobe circuit and configured to receive the detection report from the digital strobe circuit and to provide a damage report indicating damage to the radome responsive to the detection report indicating a change in impedance of at least one conductive wire of the plurality of conductive wires.

13. The radome damage detection apparatus of claim 12, wherein the conductive detection mesh is a two-dimensional conductive detection mesh and the plurality of conductive wires includes a first plurality of conductive wires oriented in a first dimension and a second plurality of conductive wires oriented in a second dimension, the first and second pluralities of conductive wires intersecting one another to provide the two-dimensional conductive detection mesh.

14. The radome damage detection apparatus of claim 13, wherein the detection report includes information identifying results of individual strobes of each of the first and second pluralities of conductive wires; and
wherein the controller is configured to localize the damage to the radome based on a pre-programmed layout of the detection mesh on the radome and to provide in the damage report information identifying a damaged region of the radome.

15. The radome damage detection apparatus of claim 14, wherein the detection report indicates a change in impedance of at least one conductive wire in the first plurality of conductive wires and at least one conductive wire in the second plurality of conductive wires, and wherein the controller is configured to localize the damage to the radome based on identification of an area where the at least one conductive wire in the first plurality of conductive wires and the at least one conductive wire in the second plurality of conductive wires intersect.

16. The radome damage detection apparatus of claim 14, wherein the controller is coupled to a radar system protected by the radome and is configured to control the radar system to adapt a coverage pattern of the radar system responsive to the damage report.

17. The radome damage detection apparatus of claim 16, wherein the controller is configured to control the radar array to adapt the coverage pattern of the radar system to substantially avoid the damaged region of the radome.

18. The radome damage detection apparatus of claim 13, wherein the first and second dimensions are orthogonal and the two-dimensional conductive detection mesh is a rectangular grid.

19. The radome damage detection apparatus of claim 12, further comprising a user interface coupled to the controller, wherein the controller is configured to display the damage report on the user interface.

20. The radome damage detection apparatus of claim 12, further comprising a wireless transmitter coupled to the controller, the controller being configured to control the wireless transmitter to transmit the damage report to a remote location.

21. The radome damage detection apparatus of claim 12, wherein the plurality of conductive wires provides a radome heating system.

22. The radome damage detection apparatus of claim 12, wherein the conductive detection mesh is a first detection mesh embedded within the radome at a first depth, and further comprising at least one additional conductive detection mesh embedded within the radome at a depth different from the first depth.

* * * * *